United States Patent [19]
Link

[11] 3,911,955
[45] Oct. 14, 1975

[54] SPRINKLER CONTROL SYSTEM

[76] Inventor: Gustav A. Link, 3710 Lomitas Drive, Los Angeles, Calif. 90032

[22] Filed: Mar. 29, 1974

[21] Appl. No.: 456,260

[52] U.S. Cl. ................. 137/624.2; 239/70; 251/30; 251/31
[51] Int. Cl.² .................... A01G 25/16; F16K 31/42
[58] Field of Search..... 137/624.11, 624.13, 624.15, 137/624.18, 624.2; 239/66, 69, 70; 251/30, 31

[56] References Cited
UNITED STATES PATENTS

| | | | |
|---|---|---|---|
| 845,063 | 2/1907 | Desper | 251/31 X |
| 3,234,410 | 2/1966 | Sherman | 137/624.2 X |
| 3,410,301 | 11/1968 | Merriner et al. | 137/624.11 X |
| 3,410,518 | 11/1968 | Carsten | 251/31 |
| 3,440,434 | 4/1969 | Yates et al. | 137/624.2 |
| 3,460,798 | 8/1969 | Carsten | 251/30 |
| 3,565,111 | 2/1971 | Pearson | 137/596.17 |
| 3,805,837 | 4/1974 | Stampfli | 137/625.6 |

*Primary Examiner*—Alan Cohan
*Assistant Examiner*—Gerald A. Michalsky
*Attorney, Agent, or Firm*—Fred N. Schwend

[57] ABSTRACT

A sprinkler system for use on parkways and the like, which permits the use of a battery-powered timer to energize a large number of solenoid-operated operated sprinkler valves, by drawing battery current for only brief periods. Each valve includes a start solenoid which can be operated by a brief current pulse to apply water pressure to a valve member to open the valve and a passage connecting the outlet to the valve member so that pressured water at the outlet thereafter keeps the valve open. A stop solenoid can be operated by a brief current pulse, to drain water from one side of the valve member so that it closes and thereafter remains closed.

5 Claims, 4 Drawing Figures

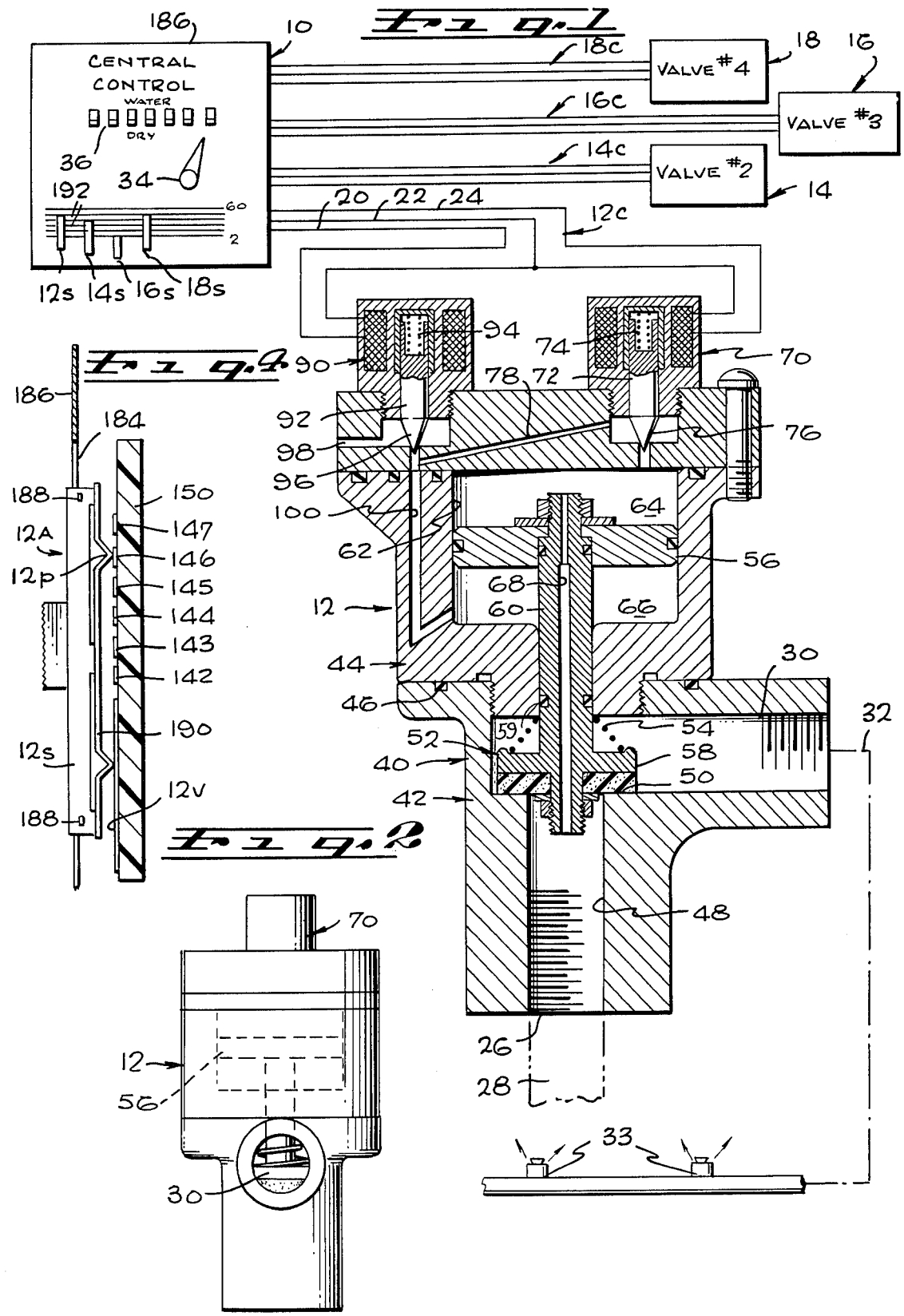

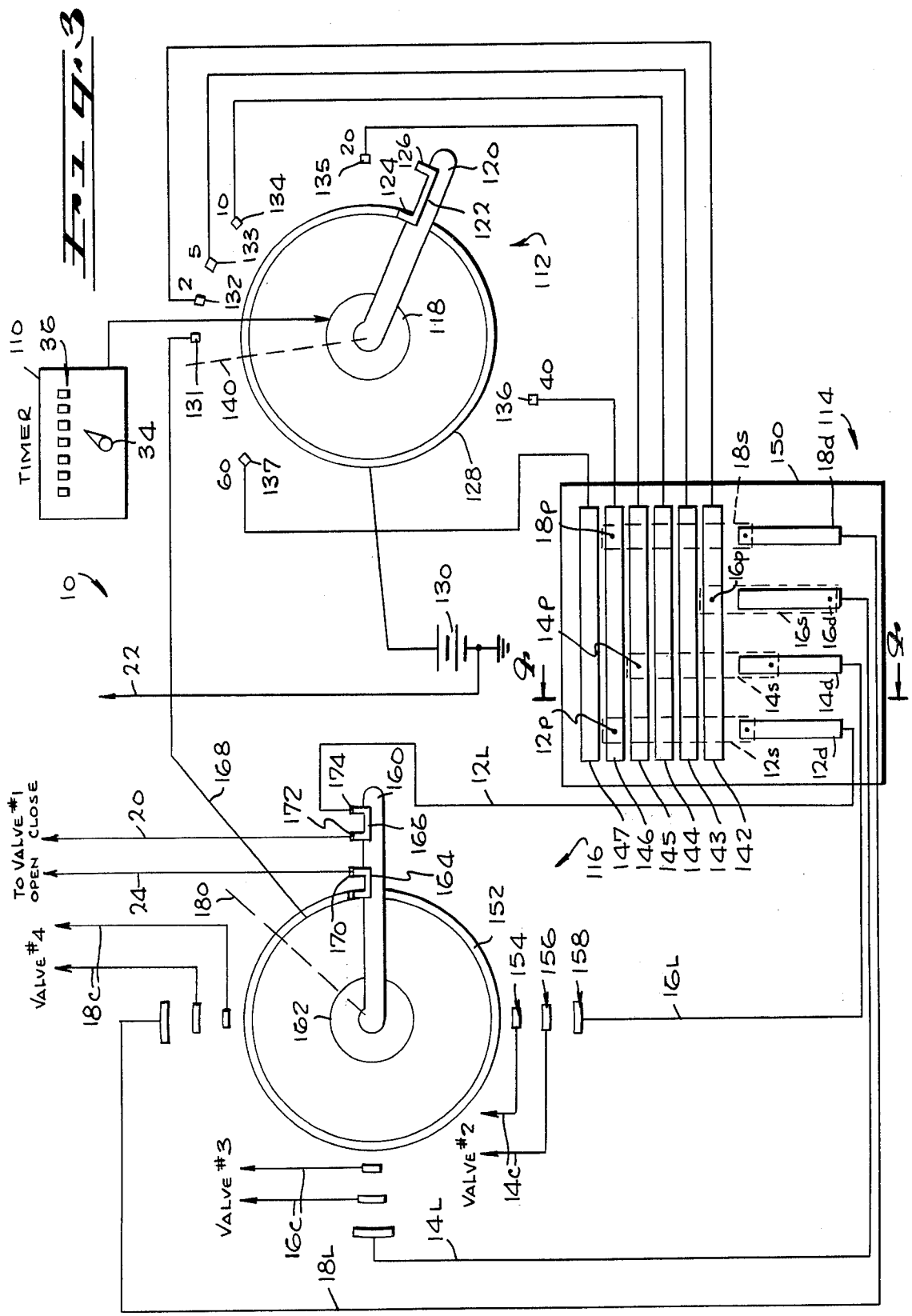

SPRINKLER CONTROL SYSTEM

BACKGROUND OF THE INVENTION

This invention relates to water sprinkler systems.

Parkways and other green strips require watering at intervals such as every few days, and preferably at particular times such as early in the morning. Such sprinkling is preferably controlled by a central control that automatically controls a group of sprinkler valves in the vicinity. One type of reliable sprinkler valve includes a solenoid that is energized from the central control to open a water valve, and which securely closes when the energizing current is removed. Such a valve has the disadvantage that it draws current during the period such as 20 minutes when the valve is open, and electric batteries for operating a group of such valves may be rapidly depleted. Battery operated central controls are desirable along parkways and the like to eliminate the cost of laying power lines to the controls.

SUMMARY OF THE INVENTION

In accordance with one embodiment of the present invention, a sprinkler control system is provided which permits long life battery operation. The system includes a central control with a battery and with a timer that controls the flow of current from the battery to remote sprinkler valves. Each valve includes a start solenoid and a stop solenoid, each of which draws a current for only a brief period of time, so that there is a minimum depletion of the battery. Energization of the start solenoid opens a passage that applies pressured water to a valve member to open the valve so that pressured water flows to the outlet. Energization of the stop solenoid opens a passage that drains away water from a pressured side of the valve member, so that the valve member closes and the valve thereafter remains closed.

The timer control includes many switches corresponding to the many sprinkler valves in the system, each switch being operable to select a particular sprinkling period for a corresponding sprinkler valve. The switch assembly includes a group of parallel conductive strips extending across all of the switches, and each switch includes a contact that can be moved to engage any one of the several strips. A sprinkling-period controller delivers a pulse to the different strips at different times in a sprinkling period, such as a pulse to a first strip after two minutes, a pulse to a second strip after five minutes, and so forth. Each switch is connected to a corresponding valve, so that the switch provides a pulse to turn off the valve at the selected time. Thus, if a first switch is set for five minutes so that it engages the five minute strip, then after five minutes a pulse passed through the strip and the corresponding switch will energize the stop solenoid of the corresponding valve to turn it off. This arrangement permits a compact control to be constructed which permits selection of a separate time period for each of a large number of sprinkler valves.

The novel features of the invention are set forth with particularity in the appended claims. The invention will best be understood from the following description when read in conjunction with the accompanying drawings.

BRIEF DESCRIPTION OF THE DRAWINGS

FIG. 1 is a block diagram and sectional side view of a sprinkler control system constructed in accordance with the invention;

FIG. 2 is a front elevation view of the sprinkler valve of the system of FIG. 1;

FIG. 3 is a partial schematic diagram of the central control of the system of FIG. 1; and FIG. 4 is a partial view taken on the line 4—4 of FIG. 3.

DESCRIPTION OF THE PREFERRED EMBODIMENTS

FIg. 1 illustrates a sprinkler system suitable for use on parkways and other regions which require periodic watering but which otherwise are subject to infrequent maintenance. Such a region is supplied with pressured water, but it is preferable to avoid the expense of connecting the system to power lines. The system includes a central control 10 and a series of identical sprinkler control valves 12, 14, 16 and 18, one of them 12 being shown in detail. Sets of electrical conductors 12c, 14c, 16c and 18c connect the central control 10 to each of the valves to carry current thereto. Each set of conductors includes three conductors such as 20, 22, and 24 which connect to the valve 12. The valve 12 has an inlet 26 which is connected to a water pipe 28 that supplies water under pressure, and the valve has an outlet 30 that is connected to a pipe 32 that leads to several sprinkler heads 33. A workman sets the central control 10 by turning a time dial 34 to select the time of day, such as 4:30 A.M., when a sprinkling cycle will begin, and moves each of seven day switches 36 to choose the days of the week on which sprinkling will occur. The workman also slides each of four switch members 12s, 14s, 16s and 18s to any of six positions to choose one of six time periods during which the corresponding valves will be open. Actually, a large number of valves and corresponding switch contacts may be utilized such as 12 of them, so that one central control is sufficient for a large area.

The valve 12 includes a housing 40 with two sections 42, 44 that connect to one another and are sealed together by an O-ring 46. A main passageway 48 forms the inlet 26 and outlet 30, and also forms a valve seat 50 therebetween. A poppet or valve member 52 normally presses against the valve seat 50 to close the valve. However, the valve member 52 can be lifted against the force of a spring 54 to permit the flow of pressured water to the outlet and therefore to the sprinkler heads.

The valve member 52 includes a piston portion 56 that is connected to the valve closer or closing portion 58 by a stem 60. The piston portion 56 is disposed in a cylinder 62 which forms an upper cavity 64 which is on a side of the piston furthest from the valve seat 50, and a lower cavity 66 which is on a side of the piston closest to the valve seat. The stem 60 carries an O-ring 59 which prevents passage of water therepast. The upper cavity 64 is always filled with pressured water which is received through a conduit 68 formed in the valve member 52 and that opens to the inlet 26 that is constantly supplied with pressured water. The pressure of water in the cavity 64 adds to the force of the spring 54 to securely keep the valve member closed on the valve seat 50. The piston portion 56 slides to permit a large travel of the valve member and easy installation, but other piston means such as a flexible diaphragm fixed along its perimeter can be used instead.

The valve 12 is opened when a current pulse is supplied to a start solenoid 70 which is mounted on the valve housing. The solenoid 70 has a plunger member 72 which is normally biased downwardly by a spring 74 so that a lower end 76 of the plunger blocks a passageway 78, 100. When the solenoid 70 is energized to lift its plunger, water in the upper cavity 64 flows through the passageway 78 which leads to the lower cavity 66. Water pressure in the lower cavity 66 rapidly increases to a level similar to that in the upper cavity 64, so that it substantially cancels the downward force on the valve member 52. The pressure of water at the inlet 26 is normally sufficient to overcome the biasing of the spring 54 and lift the valve member 52 to open the valve. It may be noted that the passageway 78, 100 not only supplies pressured water to the lower cavity but also drains water away from the upper cavity 64 to aid in opening the valve.

As soon as the valve member 52 is lifted so that the valve is opened, water rushes to the outlet 30 to fill the pipe 32 and supply water to the sprinkler heads 33. The solenoid 70 is deenergized shortly after the valve member is raised and therefore the plunger member 72 closes the passageway 78 to retain the body of water in the lower cavity 66 and thus prevent closing of the valve.

The valve is turned off or closed when a stop solenoid 90 is energized. Energization of the stop solenoid 90 results in lifting of a passage-closing member or plunger 92 against the force of a spring 94. The lower end 96 of the plunger 92 then unblocks a bleed-off passage 98 that is coupled through passageway 100 to the lower cavity 66. Water in the lower cavity 66 then drains out through the bleed-off passage 98, so that the pressure in cavity 66 is quickly lowered and the valve member 52 is moved down by reason of the pressured water in the upper cavity 64. Solenoid 90 is then deenergized, again closing passageway 100. Once the valve member 52 is lowered on the valve seat 50, pressure at the outlet 30 quickly drops and the valve remains closed even though the stop solenoid 90 is no longer activated.

The valve 12 can be reliably operated by passing large currents through the solenoids 70 and 90. However, the currents need be applied for only brief periods of time. For example, a current can be applied for only a few seconds to the start solenoid 70 to turn on the valve, and another current applied for only a second to the stop solenoid 90 at perhaps an hour later, to keep the sprinkler valve 12 open for one hour. This can be contrasted with a common type of system wherein current must be applied constantly to a solenoid to keep the valve on, so that the current may have to be applied for a period such as 60 minutes to keep the sprinkler valve on for 60 minutes. The system of the present invention therefore utilizes much less current, and battery operation can be employed without requiring frequent changing of the battery.

FIG. 3 illustrates details of the central control 10 that supplies currents to the four valves to turn them on and off. The circuit has a timer portion 110 which includes the dial 34 that selects the time of day when a sprinkling cycle will occur and the group of switches 36 that select the days on which sprinkling cycles will occur.

The circuit also includes a period controller 112 that times the sprinkling periods, a period selecting portion 114 which includes the four switch members 12s–18s that are set to select sprinkling periods for each of the four valves, and a distributor 116 that distributes pulses to the four valves in sequence. At the times when sprinkling cycles are to occur, the timer 110 delivers a current to a motor 118 of the controller 112 to rotate a wiper arm 120. The wiper arm 120 contains a wiper 122 with two blades 124, 126. The blade 124 contacts a stationary ring contact 128 that is connected to a battery 130. A series of seven stationary contact segments 131–137 is spaced along the path of the other wiper blade 126. The wiper arm 120 begins rotating from an initial position indicated by the phantom line 140, and the motor 118 is energized by a circuit portion (not shown) which causes the wiper arm to slowly make four revolutions and then stop. At the beginning of each revolution, the wiper blade 126 contacts the segment 131, and then contacts the other segments 132–137 after 2, 5, 10, 20, 40 and 60 minutes, respectively. Each time the blade 126 engages a segment it delivers a current thereto.

The current pulses to the segments 132–137 are delivered to respective ones of six contact strips 142–147 of the period setting portion 114 of the central control. The strips 142–147 are parallel conductive strips formed on a circuit board 150. The four switch members 12s–18s have contacting portions 12p–18p that selectively engage the strips depending upon the positions of the switch members. The lower ends of the switch members 12s–18s engage four vertical strips 12d–18d. These vertical strips are connected through four lines 12L–18L to the distributor 116. Thus, current pulses appear on the four lines 12L–18L after times ranging from two to 60 minutes following the beginning of each rotation of the controller wiper 120 from its initial position.

The distributor 116 has four circles of stationary contacts, including a ring-shaped contact 152 and three other sets of contact segments 154, 156, and 158. Segments from each of the three outer circles 154–158 are spaced 90° from one another about the axis of rotation of a wiper arm 160. The wiper arm 160 is intermittently driven by a motor 162 and carries two wipers 164, 166. The ring contact 152 is connected by a wire 168 to the contact segment 131 of the period controller 112. Thus, a voltage is applied to the ring 152 at the beginning of each rotation of the controller wiper 120. When the distributor wiper 160 is in the position shown in FIG. 3, the wiper 164 connects the ring contact 152 to a contact segment 170 that is connected to the wire 24 which leads to the start solenoid of the first valve 12. Thus, at the beginning of rotation of the controller wiper 120, a current pulse is delivered through the wire 24 to open the valve.

The other wiper 166 of the distributor can connect together two contact segments 172, 174. The segment 172 is connected to the line 20 that leads to the stop solenoid of the first valve 12, while the segment 174 is connected to the output line 12L of the first setting switch member 12s. Thus, at a predetermined time after a pulse has been delivered to the first valve to open it, a pulse is delivered through the line 12L and through the wiper 166 to the line 20 that leads to the stop solenoid to close the valve. In FIG. 3, the switch member 12s is shown as positioned to contact the strip 146 which receives a pulse 40 minutes after the starting pulse, so that the first valve will be turned off 40 minutes after it is turned on.

The motor 162 of the distributor is energized by a circuit (not shown) to advance the wiper arm 160 by 90° after each rotation of the controller wiper 120. Thus, two spaced pulses will be later delivered to the lines 14c that lead to the second valve to open and then close that valve, and pulses will similarly be delivered to the other lines 16c and 18c. The separation between the two pulses delivered to each of the valves will be determined by the setting of the corresponding switch members 14s–18s. After the wiper arm 160 of the distributor has made a complete revolution, it is stopped at the position 180 and will not rotate again until the time of the next sprinkling cycle as determined by the timer 110.

FIG. 4 illustrates the details of one of the setting switches 12A. The switch member 12s slides along a slot 184 in a cover plate 186, and the member has projections 188 for retaining it in position with respect to the cover plate. A resilient electrical contact 190 is fastened to the bottom of the slideable member 12s. THe contact 190 forms the contact location 12p that can contact any of the six contact strips 142–147. A series of indexing recesses (not shown) in the cover plate helps to retain the member 12s at any of the six positions to which it is moved. An operator selects a sprinkling period by moving the member 12s up or down to a selected position. As shown in FIg. 1, six horizontal lines 192 are imprinted on the cover plate 186, so that an operator can determine the time setting.

In many situations, one central control of the type shown at 10 is utilized to control sprinkling periods for a large number of sprinkler valves such as 12 of them. The central control can be constructed to control 12 valves without excessive complication. The switching portion 114 which is shown as having four switches, may be constructed to operate a large number of valves without greatly increased cost. Such an increase merely requires that the six strips 142–147 be made longer and that additional switches be added. Also, the operator can readily set the switches, because a row of 12 switches looks uncomplicated and the same six indicator lines 192 can be utilized for all 12 or more of the switches. This can be contrasted with sprinkler systems which utilize 12 separate dials, and wherein each dial would have to be provided with a separate set of six indications, and where the overall appearance would be complicated.

Thus, the invention provides a sprinkler system of relatively simple design and which requires little current so that battery operation is feasible. The sprinkler system includes a valve with a pair of solenoids for opening and closing the valve, the valve being constructed so that it remains indefinitely in the opened or closed conditions after brief operation of a corresponding solenoid. This results in only a low current drain, and therefore permits reliable battery operation of the system. The central control includes a series of time-setting switches which are constructed at low cost and which provide a simple appearance that facilitates operation by workmen.

In the appended claims, it is intended that the recitation of a cylinder and piston movable therein also defines a chamber and diaphragm movable therein.

What is claimed is:

1. A sprinkler system comprising
a central station having an electric energizing signal source,
a plurality of water valves,
each of said valves having a passageway with an inlet and an outlet,
a valve closer movable between open and closed positions in said passageway,
piston means coupled to said valve closer to operate said closer,
means defining a first cavity facing one side of said piston,
means forming a normally blocked first passage connected to said cavity to carry pressured water thereto to open said valve closer,
a start solenoid energizable to unblock said first passage,
means forming a normally blocked drain passage connected to said cavity to drain off water therefrom to permit said valve closer to close, and a stop solenoid energizable to open said drain passage;
a plurality of conductors at said central station,
timing switch means at said central station to apply short signal pulses from said signal source at timed intervals sequentially to different ones of said conductors,
a plurality of switch members manually settable into contact with different ones of said conductors,
means comprising a distributor at said central station arranged to successively electrically connect the solenoids of different valves to said switch members for successively conditioning the said start and stop solenoids of said different ones of said valves to be energized by said signal pulses whereby operation of said timing switch means sends sequential pulses, through said switch members, to said start and stop solenoids conditioned by said distributor.

2. A sprinkler system as defined in claim 1 wherein said conductors have portions extending parallel to each other and said switch members are movable perpendicular to said parallel portions into contact with selected ones of said conductors.

3. A sprinkler system as defined in claim 1 wherein said timing switch means applies signal pulses to said solenoids for predetermined period of time less than the time interval between energization of a said start soleniod and a said stop solenoid of each of said valves.

4. A sprinkler system as defined in claim 1 wherein said timing switch means successively applies signal pulses at progressively different times to said conductors.

5. A sprinkler system as defined in claim 1 wherein said timing switch means applies each of said signal pulses to said conductors for a period of time equal to the time necessary to move said valve closer between open and closed positions.

* * * * *